United States Patent
Chang et al.

(10) Patent No.: US 7,367,313 B2
(45) Date of Patent: May 6, 2008

(54) SPEED TRANSIENT CONTROL METHODS FOR DIRECT-INJECTION ENGINES WITH CONTROLLED AUTO-IGNITION COMBUSTION

(75) Inventors: Chen-Fang Chang, Troy, MI (US); Zongxuan Sun, Troy, MI (US); Jun-Mo Kang, Ann Arbor, MI (US); Tang-Wei Kuo, Troy, MI (US); James A. Eng, Troy, MI (US); Barry L. Brown, Lake Orion, MI (US); Paul M. Najt, Bloomfield Hills, MI (US); Man-Feng Chang, Troy, MI (US)

(73) Assignee: GM Global Technology OPerations, Inc., Detroit, MI (US)

( * ) Notice: Subject to any disclaimer, the term of this patent is extended or adjusted under 35 U.S.C. 154(b) by 12 days.

(21) Appl. No.: 11/367,047

(22) Filed: Mar. 2, 2006

(65) Prior Publication Data
US 2006/0196468 A1  Sep. 7, 2006

Related U.S. Application Data

(60) Provisional application No. 60/658,290, filed on Mar. 3, 2005.

(51) Int. Cl.
*F02D 43/00*  (2006.01)
(52) U.S. Cl. .................. 123/305; 123/436; 123/90.15; 123/568.14
(58) Field of Classification Search ............... 123/443, 123/295, 305, 399, 436, 568.11, 568.14, 90.15, 123/406.59, 406.64, 406.65, 480; 710/110
See application file for complete search history.

(56) References Cited

U.S. PATENT DOCUMENTS

| | | | |
|---|---|---|---|
| 4,446,830 A | 5/1984 | Simko et al. | |
| 5,713,328 A | 2/1998 | Anderson et al. | |

(Continued)

FOREIGN PATENT DOCUMENTS

WO  WO 01/46571  6/2001

(Continued)

OTHER PUBLICATIONS

SAE Tech Paper Series #980495, "Fuel Injection Strategies to Increase Full-Load Torque Output of a Direct-Injection SI Engine", Yang and Anderson; Feb. 23-26, 1998.

(Continued)

*Primary Examiner*—Hai Huynh

(57) ABSTRACT

A direct injection controlled auto-ignition engine is operated at steady state, within a homogeneous charge compression-ignition (HCCI) load range and with fuel-air-diluent mixtures at predetermined conditions, for each speed and load, of engine control inputs, including at least injection timing (FI), spark timing (SI), throttle position, exhaust gas recirculation (EGR) valve setting and exhaust recompression obtained by negative valve overlap (NVO). During engine speed transients, the control inputs are synchronized to changes in the current engine speed, and also with any concurrent changes in the engine fueling rate. Inputs that are inactive during all or part of a speed change have a zero change rate while inactive. The method maintains robust auto-ignition combustion during speed transients with constant or variable fueling rates and with or without load changes.

7 Claims, 17 Drawing Sheets

U.S. PATENT DOCUMENTS

| | | |
|---|---|---|
| 5,746,182 A | 5/1998 | Nada |
| 6,082,342 A | 7/2000 | Duret et al. |
| 6,155,217 A | 12/2000 | Shiraishi et al. |
| 6,286,478 B1 | 9/2001 | Atago et al. |
| 6,336,436 B1 | 1/2002 | Miyakubo et al. |
| 6,386,177 B2 | 5/2002 | Urushihara et al. |
| 6,497,213 B2 | 12/2002 | Yoshizawa et al. |
| 6,619,255 B2 | 9/2003 | Urushihara et al. |
| 6,622,689 B2 * | 9/2003 | Hasegawa et al. .......... 123/294 |
| 6,636,197 B1 | 10/2003 | Goldenberg et al. |
| 6,640,771 B2 | 11/2003 | Fuerhapter |
| 6,651,616 B1 * | 11/2003 | Juretzka et al. ............. 123/305 |
| 7,004,116 B2 * | 2/2006 | Allen ........................ 123/27 R |
| 7,017,561 B1 * | 3/2006 | Liu et al. ................ 123/568.12 |
| 7,021,277 B2 * | 4/2006 | Kuo et al. ................... 123/299 |
| 7,089,912 B2 * | 8/2006 | Koopmans ............. 123/406.45 |
| 7,128,047 B2 * | 10/2006 | Kuo et al. ................... 123/299 |
| 7,171,957 B2 * | 2/2007 | Liu et al. ............... 123/568.12 |
| 7,194,996 B2 * | 3/2007 | Koopmans .................. 123/295 |
| 2004/0134449 A1 | 7/2004 | Yang |
| 2004/0173180 A1 | 9/2004 | Strom et al. |
| 2004/0182359 A1 | 9/2004 | Stewart et al. |
| 2006/0016421 A1 | 1/2006 | Kuo et al. |
| 2006/0016422 A1 | 1/2006 | Kuo et al. |
| 2006/0016423 A1 | 1/2006 | Kuo et al. |
| 2006/0243241 A1 * | 11/2006 | Kuo et al. ................... 123/295 |

FOREIGN PATENT DOCUMENTS

| WO | WO 01/46572 | 6/2001 |
|---|---|---|
| WO | WO 01/46573 | 6/2001 |

OTHER PUBLICATIONS

U.S. Appl. No. 11/367,045, filed Mar. 2, 2006, Kuo et al.
U.S. Appl. No. 11/366,217, filed Mar. 2, 2006, Kang et al.
U.S. Appl. No. 11/367,050, filed Mar. 2, 2006, Kuo et al.

* cited by examiner

SPEED TRANSIENT CONTROL METHODS FOR DIRECT-INJECTION ENGINES WITH CONTROLLED AUTO-IGNITION COMBUSTION

CROSS-REFERENCE TO RELATED APPLICATIONS

This application claims priority from U.S. Provisional Patent Application No. 60/658,290 filed Mar. 3, 2005.

TECHNICAL FIELD

This invention relates to controlled auto-ignition internal combustion engines. More particularly, the invention is concerned with stability in speed transitions in such engines.

BACKGROUND OF THE INVENTION

To improve thermal efficiency of gasoline internal combustion engines, dilute combustion—using either air or re-circulated exhaust gas—is known to give enhanced thermal efficiency and low NOx emissions. However, there is a limit at which an engine can be operated with a diluted mixture because of misfire and combustion instability as a result of a slow burn. Known methods to extend the dilution limit include 1) improving ignitability of the mixture by enhancing ignition and fuel preparation, 2) increasing the flame speed by introducing charge motion and turbulence, and 3) operating the engine under controlled auto-ignition combustion.

The controlled auto-ignition process is sometimes called the Homogeneous Charge Compression Ignition (HCCI) process. In this process, a mixture of combusted gases, air and fuel is created and auto-ignition is initiated simultaneously from many ignition sites within the mixture during compression, resulting in very stable power output and high thermal efficiency. Since the combustion is highly diluted and uniformly distributed throughout the charge, the burned gas temperature, and hence NOx emission, is substantially lower than that of the traditional spark ignition engine based on propagating flame front, and the diesel engine based on an attached diffusion flame. In both spark ignition and diesel engines, the burned gas temperature is highly heterogeneous within the mixture with very high local temperature creating high NOx emissions.

Engines operating under controlled auto-ignition combustion have been successfully demonstrated in two-stroke gasoline engines using a conventional compression ratio. It is believed that the high proportion of burned gases remaining from the previous cycle, i.e. the residual content, within the two-stroke engine combustion chamber is responsible for providing the high mixture temperature necessary to promote auto-ignition in a highly diluted mixture. In four-stroke engines with traditional valve means, the residual content is low, controlled auto-ignition at part load is difficult to achieve. Known methods to induce controlled auto-ignition at part load include: 1) intake air heating, 2) variable compression ratio, and 3) blending gasoline with fuel that has wider auto-ignition ranges than gasoline. In all the above methods, the range of engine speeds and loads in which controlled auto-ignition combustion can be achieved is relatively narrow.

Engines operating under controlled auto-ignition combustion have been demonstrated in four-stroke gasoline engines using variable valve actuation to obtain the necessary conditions for auto-ignition in a highly diluted mixture. Various fueling controls including split and single injections have been proposed for use in conjunction with valve control strategies to maintain stable auto-ignition combustion across a variety of engine load conditions.

In commonly assigned U.S. patent application Ser. No. 10/899,457 an exemplary fuel injection and valve strategy for stable, extended controlled auto-ignition is disclosed. Therein, during operation with low part load, a first injection of fixed amount of fuel during the negative valve overlap period is followed by a second fuel injection during the subsequent compression stroke. The injection timing for the first injection retards and the injection timing for the second injection advances in a continuous manner as the engine load increases. During operation with intermediate part load, a first injection of fuel during the negative valve overlap period followed immediately by a second injection of fuel during the subsequent intake stroke supports auto-ignition. Optimal separation of the two injections is around 30 to 60 degrees crank angle. The injection timings of both injections retard in a continuous manner as the engine load increases. And, during operation with high part load, a single fuel injection during the intake stroke supports auto-ignition. The injection timing retards as the engine load increases.

While the advances outlined above have successfully demonstrated controlled auto-ignition capabilities at steady state conditions, rapid speed changes or transients may introduce undesirable combustion results.

SUMMARY OF THE INVENTION

In a controlled auto-ignition engine, combustion phasing is strongly affected by charge temperature, e.g., high charge temperature advances combustion phasing and may result in knocking, while low charge temperature retards combustion phasing and may result in partial-burn or misfire. While the engine running at a steady state can be very stable with appropriate operating parameters, such as injection timing, cam phasing, spark timing, etc., a smooth transition from one steady state to another is desired for optimal engine and vehicle operation. The present invention provides a system and method for robust auto-ignition combustion control during speed transient operations with either constant or variable fuel injection mass fueling rates. Using various combinations of injection and valve strategies, stable controlled auto-ignition combustion is maintained during speed transients with the present invention.

At low loads, the engine is operated unthrottled with lean fuel/air ratios and controlled auto-ignition, using exhaust recompression for controlling combustion temperatures. At high part load, stoichiometric operation is required for NOx emission control, so throttled operation and external exhaust gas recirculation (EGR) are added for combustion temperature control. Steady state combustion conditions obtained from lookup tables are used for steady state operation at various loads and speeds.

In HCCI operation with lean air-fuel ratios in the lower load range, rapid speed changes from low to high speeds and back to low speed may be accomplished without excessive combustion variations by synchronizing fuel injection timing (FI), spark timing (SI) and negative valve overlap (NVO) to the changes in the current fueling mass flow rate. In stoichiometric operation at higher loads, throttle position and external EGR are added to NVO for combustion temperature control. When load changes are combined with speed changes, synchronization of control inputs with the combined effects of speed and load (mass fueling rate) is required to maintain stable combustion conditions as found in the look-up tables for steady state operation. Where necessary, during rapid load changes exceeding a predetermined threshold, further adjustments in throttle, EGR or NVO may be required to maintain adequate gas temperatures in the cylinders to ensure stable combustion.

A feed forward control is provided with which inputs to the engine, including spark timing, fuel injection timing, and valve timing, are continually set equal to steady state inputs corresponding to the current fueling rate and engine speed. Pre-calibrated steady state inputs are stored in look up tables, and inputs to the engine are determined by interpolating values of steady state inputs in the look up tables based on the current fueling rate and engine speed. Rate limiters are used to compensate for different dynamics in the system, such as by controlling the rates of air and fuel delivery to synchronize with the desired speed transients.

A feedback control may be provided to assist the performance of the feed forward control by adjusting the control inputs to compensate for any variations caused by differing environmental, manufacturing and aging conditions.

These and other features and advantages of the invention will be more fully understood from the following description of certain specific embodiments of the invention taken together with the accompanying drawings.

DESCRIPTION OF THE PREFERRED EMBODIMENT

For simplicity, the following descriptions will address the present invention in its application to a single cylinder direct-injection gasoline four-stroke internal combustion engine, although it should be appreciated that the present invention is equally applicable to a multi-cylinder direct-injection gasoline four-stroke internal combustion engines. A four-stroke, single cylinder, 0.55 liter, internal combustion engine was utilized in implementing the various controls and acquisition of the various data embodied herein. Unless specifically discussed otherwise, all such implementations and acquisitions are assumed to be carried out under standard conditions as understood by one having ordinary skill in the art. The present invention is described in its application to a two valves per cylinder engine (one intake and one exhaust valve), although it should be appreciated that the present invention is equally applicable to a multi-valve per cylinder engine. And, although the present invention is applicable to any variable valve actuation (VVA) strategy using either a fully flexible electro-hydraulic or an electromechanical system, the example used below to illustrate our control strategy is based on a two-step with dual cam phasing VVA system.

Figure 1:
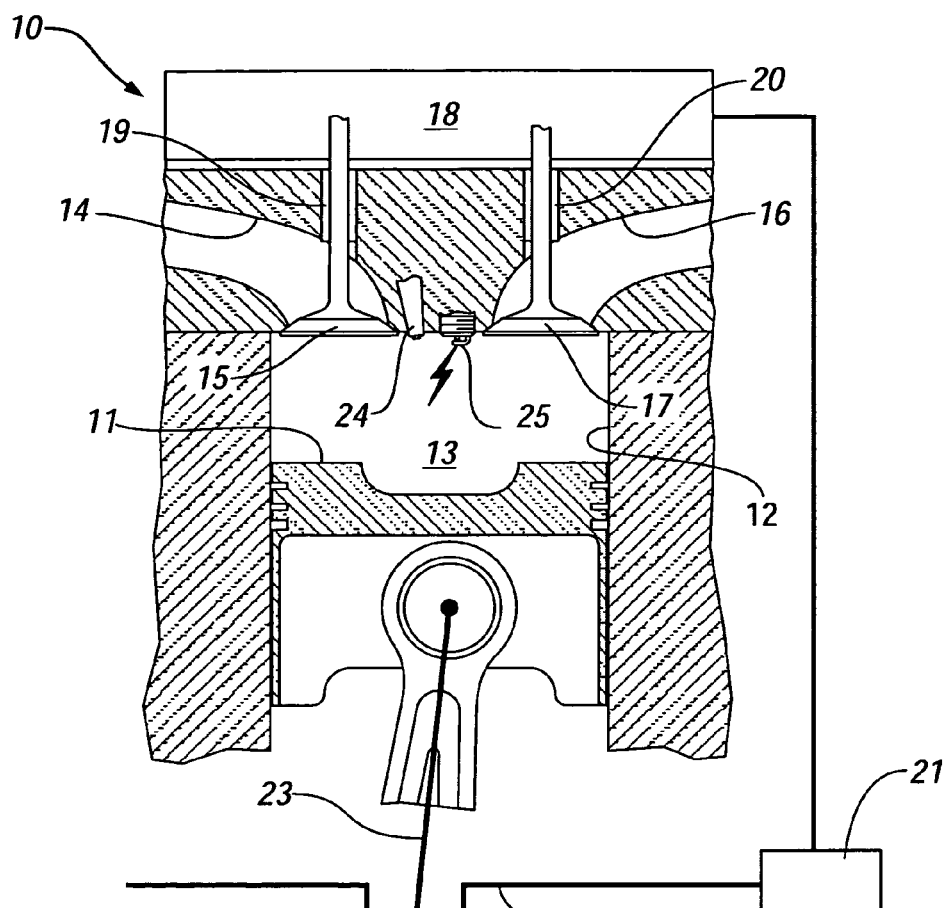
FIG. 1 is a schematic illustration of a single cylinder gasoline direct-injection four-stroke internal combustion engine capable of being operated according to the present invention.

Referring first to FIG. 1 of the drawings in detail, numeral 10 generally indicates a schematic representation of an exemplary single-cylinder direct-injection four-stroke internal combustion engine. In the figure, a piston 11 is movable in a cylinder 12 and defines with the cylinder 12 a variable volume combustion chamber 13. An intake passage 14 supplies air into the combustion chamber 13. Air flow into the combustion chamber 13 is controlled by an intake valve 15. Combusted gases can flow from the combustion chamber 13 via an exhaust passage 16, controlled by an exhaust valve 17.

Exemplary engine 10 has a hydraulically controlled valve train with an electronic controller 18, which is programmable and hydraulically controls the opening and closing of both the intake 15 and exhaust 17 valves. The electronic controller 18 will control the movement of the intake valve 15 and exhaust valve 17 having regard to the positions of the intake and exhaust valves 15 and 17 as measured by two position transducers 19 and 20. The controller 18 will also refer to the angular position of the engine, as indicated by a rotation sensor 21 connected to the engine crankshaft 22. The crankshaft 22 is connected by a connecting rod 23 to the piston 11 reciprocating in the cylinder 12. A gasoline direct injector 24, controlled by the electronic controller 18, is used to inject fuel directly into the combustion chamber 13. The various functions ascribed to the controller 18 may equally well be performed by a plurality of separate but coordinated controllers adapted for the various tasks.

A spark plug 25, controlled also by the electronic controller 18, is used to enhance the ignition timing control of the engine at certain conditions (e.g. during cold start and near the low load operation limit). Also, it has proven preferable to rely on spark ignition near the high part-load operation limit under controlled auto-ignition combustion and during high speed/load operating conditions with throttled or non-throttled SI operation.

Figure 2:
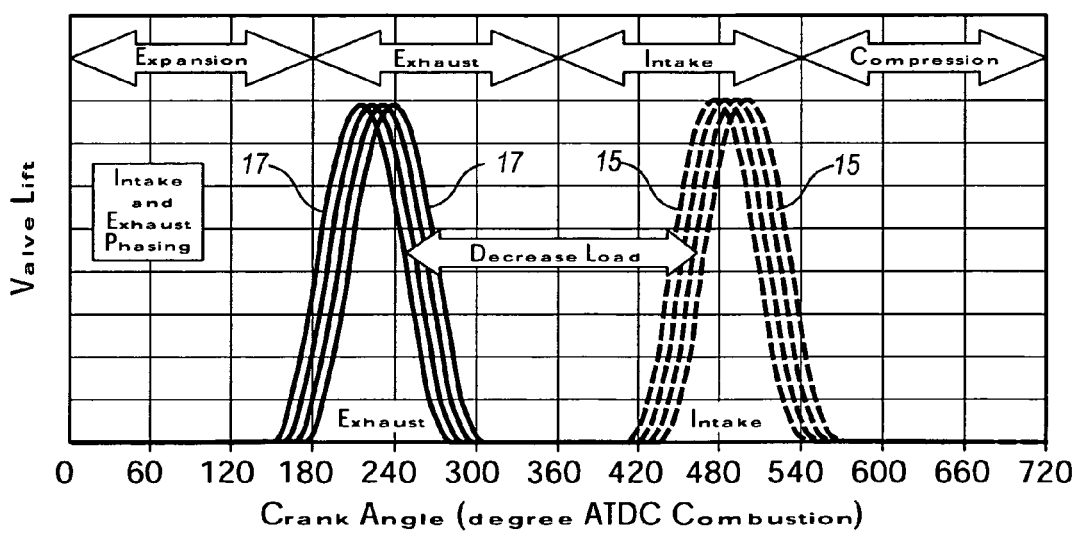
FIG. 2 is a graph of valve lift vs. crank angle for the phasing of exhaust and intake valves of a four-stroke internal combustion engine operating at different loads according to exemplary controlled auto-ignition control using two-step variable valve actuation with dual cam phasing.

FIG. 2 illustrates the control motions of the intake valve 15 and exhaust valve 17 wherein the valve lift profiles are shown as a function of crank angle for the exhaust 17 and intake 15 valves of the four-stroke internal combustion engine operating with exemplary controlled auto-ignition (HCCI combustion) controls.

Motion of the exhaust valve is shown by the solid lines 17 and motion of the intake valve is indicated by the dashed lines 15. The exhaust valve 17 closes early, at a variable angle before the exhaust/intake top dead center (TDC 360 degrees) and the intake valve 15 opens late, preferably at an equal angle after TDC. The interim period when both valves are closed is referred to as negative valve overlap (NVO). The paired exhaust/intake valve profiles 17, 15, ranging from the pair closest together to the pair furthest apart represent increasing NVO with decreasing engine loads (NMEP) of, sequentially, 350, 285, 215 and 144 kPa. This valve motion can be achieved using a dual cam phasing system, or by any other devices that can generate such valve profiles.

With this strategy, the negative valve overlap (NVO) is varied by phasing of both intake and exhaust lift profiles simultaneously. It is experimentally confirmed that for maintaining optimal auto-ignition combustion throughout the load range, the required negative valve overlap period increases linearly with decreasing engine load, which relationship is illustrated in FIG. 2.

Figure 3A:
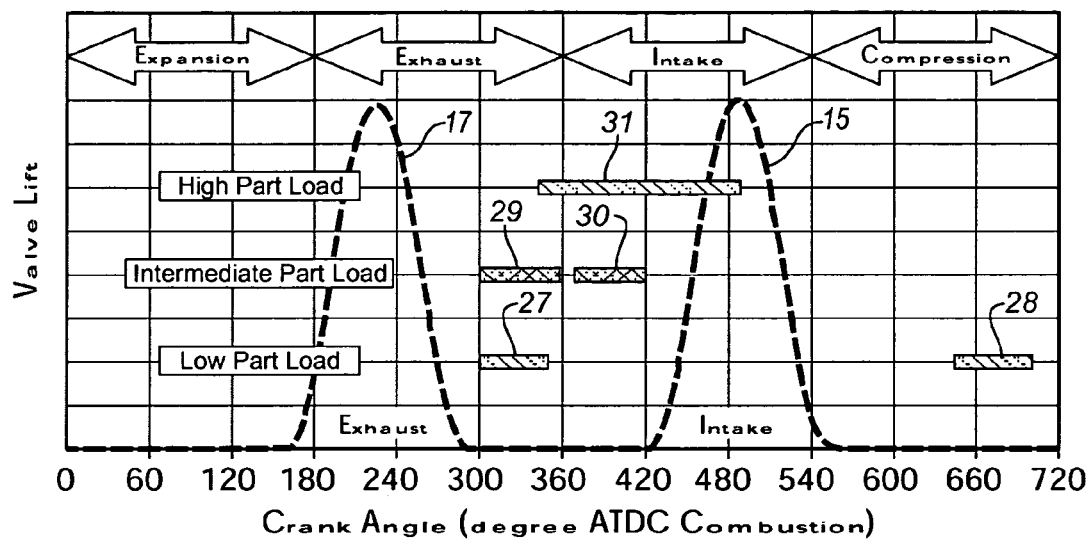
FIG. 3A is a graph of typical intake and exhaust valve events vs. crank angle with exemplary controlled auto-ignition injection strategies for engine operation with low, intermediate, and high part loads, respectively.

FIG. 3A shows exemplary injection strategies during engine operation with low, intermediate, and high part loads, respectively. Also shown in FIG. 3A are exemplary intake and exhaust valve events and, in FIG. 3B is shown in-cylinder pressure history in accordance with such exemplary valve events.

During operation with low part load, the fuel injector is activated twice during a single engine cycle as indicated by spaced bars 27, 28. The first injection 27, between about 300 and 350 degrees ATDC combustion, sprays a fixed amount of gasoline or equivalent fuel into the high temperature and pressure exhaust gas trapped in the cylinder during the negative valve overlap period. The injection timing for the first injection is retarded in a continuous manner as the engine load increases. The fuel is partially oxidized and converted to more reactive chemical species and energy is released. The amount of the more reactive chemical species and energy varies with the quantity and timing of fuel injected in the first injection and the negative valve overlap (NVO) period.

Figure 3B:
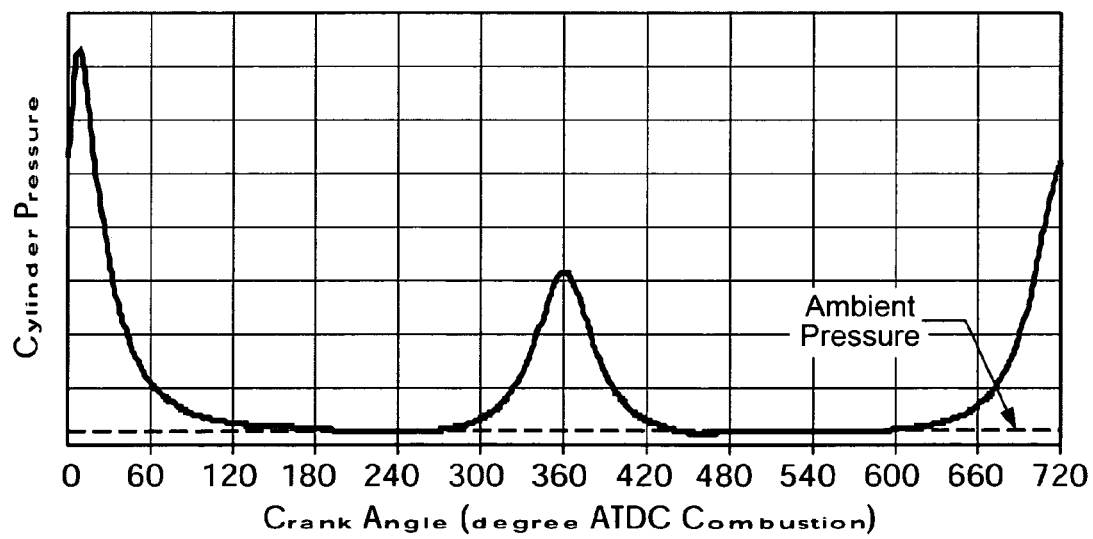
FIG. 3B is a graph of a typical in-cylinder pressure history vs. crank angle for exemplary controlled auto-ignition exhaust recompression valve strategy.

As shown in FIG. 3B, the trapped gases are first compressed in the NVO period toward the end of the exhaust stroke between about 300 and 360 degrees ATDC, after the exhaust valve closes. The compressed fuel and exhaust gas mixture is then expanded during the early part of the intake stroke when both the intake and exhaust valves are closed. The cylinder pressure drops to around the ambient pressure at which time the intake valve opens to induct fresh air into the combustion chamber. During the compression stroke, the fuel injector is activated again at 28 for a second injection of gasoline into the combustion chamber between 60 and 20 degrees BTDC combustion. This injection timing is chosen to ensure smoke-free operation and is affected by either the injector spray cone angle or the amount of fuel injected.

The injection timing for the second injection is advanced in a continuous manner as the engine load increases. Penetration and dispersion of the fuel spray are suppressed due to higher in-cylinder charge temperature and density. A localized rich mixture region is formed in the combustion chamber. The species formed by gasoline reforming after the first fuel injection works in conjunction with the localized rich mixture formed by the second fuel injection to accomplish the auto-ignition of gasoline under a relatively low compression ratio without any help of spark, as compared to a relatively high compression ratio used in a diesel engine.

During operation with intermediate part load, the fuel injector is also activated twice during a single engine cycle as shown by adjacent bars 29, 30. The first injection 29 sprays gasoline into the combustion chamber between about 300 and 360 degrees ATDC combustion, similar to that used in the operation with low part load. The second injection 30, however, starts about 30 to 60 degrees after the end of the first injection. Both injections are performed during the negative valve overlap period or subsequent intake stroke. The injection timings of both injections are retarded in a continuous manner as the engine load increases. The objective is to use split injection for controlling gasoline reform, and thus the auto-ignition process. For both low and intermediate part load operations, 1-3 mg of fuel is sufficient for the first injection 29. The remaining fuel is injected during the second injection 30.

During operation with high part load, the fuel injector is activated only once during a single engine cycle, as shown by bar 31. The injection timing varies between 340 and 490 degrees ATDC combustion depending on the engine load. The injection timing is retarded as the engine load increases.

Transition from one injection strategy to another during load change is regulated to benefit both engine performance and emissions. For example, during operation with low part load, split injection—with the first injection 27 during the negative valve overlap period and the second injection 28 during the compression stroke—is the only injection strategy that has proved capable of generating stable controlled auto-ignition combustion. The injection timing for the second injection 28 is advanced continuously with increasing engine load to promote dispersion of fuel within the cylinder content and to keep the air/fuel ratio of the localized mixture within an acceptable range to avoid excessive emissions of NOx and smoke.

However, even with the advanced injection timing, formation of nitrogen oxides (NOx) can still rise to unacceptable levels during operation at intermediate part load. Thus, with intermediate part load, the injection timing of the second fuel injection 30 is switched from the compression stroke to the intake stroke as shown in FIG. 3A. It is confirmed experimentally that both strategies result in similar engine performance. Although the NOx emission can be greatly reduced with the second fuel injection 30 during the intake stroke, the HC emission increases due to an increase in the crevice-trapped fuel that escapes combustion. The exact load where the transition takes place will be determined by emissions tradeoff.

Figure 4:
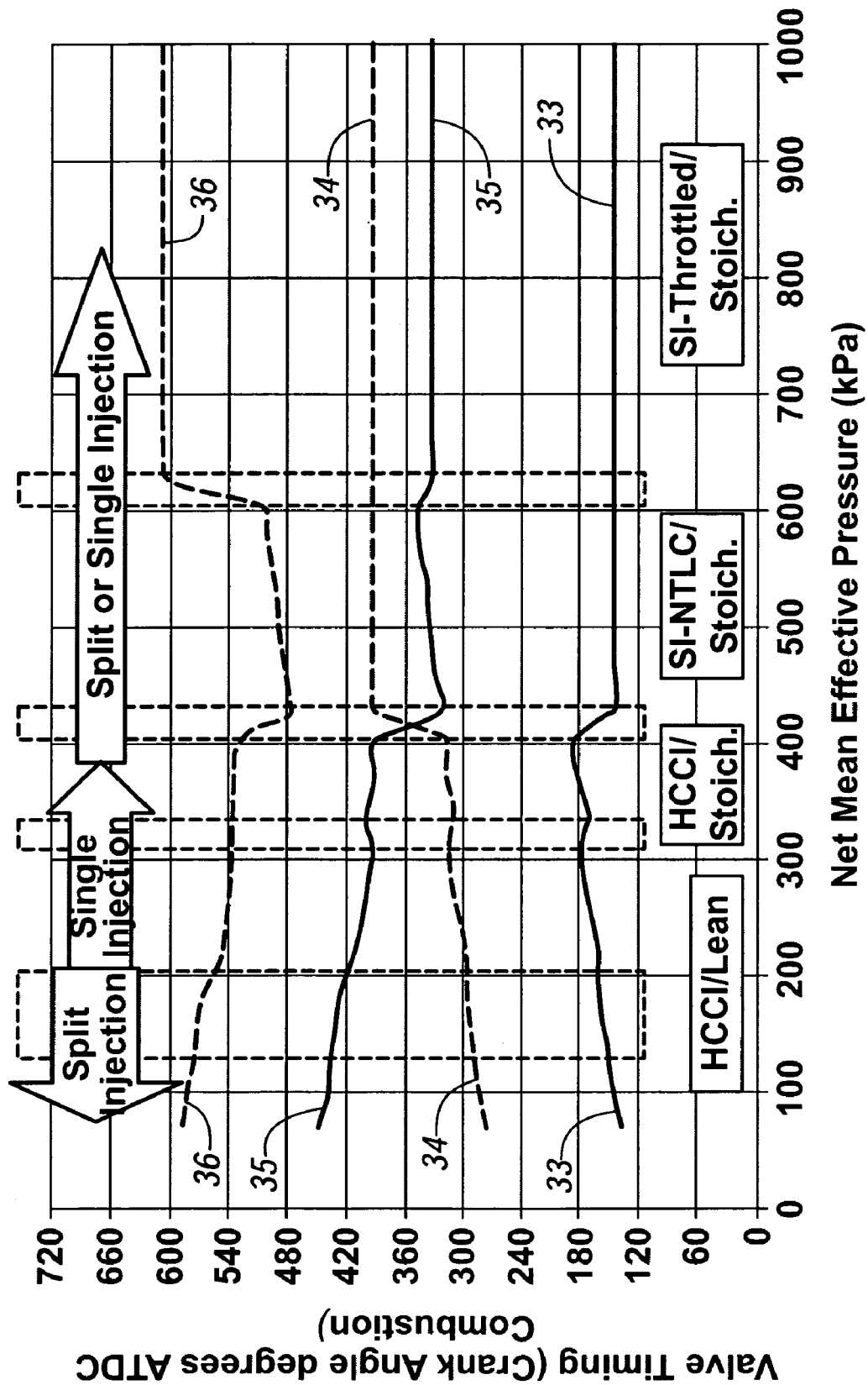
FIG. 4 is a graph of exemplary overall operating strategy vs. engine load for exhaust and intake valves, fuel injection and operation mode for a single cylinder four-stroke internal combustion engine operating according to exemplary controlled auto-ignition controls using a two-step with dual cam phasing variable valve actuation system.

FIG. 4 shows exemplary opening and closing valve timings as a function of engine load for the exhaust and intake valves of a single cylinder four-stroke internal combustion engine operating at a constant speed. The valve control exemplifies exhaust recompression using a two-step with dual cam phasing VVA system. Exhaust valve openings over the load range (NMEP) are shown by a solid line 33 and exhaust valve closings by a dashed line 34. Intake valve openings are shown by a solid line 35 and intake valve closings by a dashed line 36. Also shown in FIG. 4 are the injection strategy (split vs. single) and various combustion modes as a function of engine load at an exemplary constant speed.

In particular, the engine is operated in the controlled auto-ignition combustion mode with lean air/fuel mixture (HCCI/Lean) below 320 kPa NMEP. During this combustion mode, the NOx emission index increases with increasing engine load. At 320 kPa NMEP, the NOx emission index is around 1 g/kg fuel. Accordingly, between 320 and 400 kPa NMEP, the engine is operated in the controlled auto-ignition combustion mode with stoichiometric air/fuel ratio (HCCI/Stoich.) to allow the use of a traditional after treatment device for NOx control. Split injection may be used in the higher load portion of this mode to limit the maximum rate of cylinder pressure rise.

Between 400 and 600 kPa NMEP, the engine is operated in a spark-ignition, non-throttled stoichiometric mode with load controlled by VVA strategies such as early intake valve closing (SI-NTLC/Stoich, as shown) or late intake valve closing. Beyond 600 kPa NMEP, the engine is operated in a traditional spark-ignition and throttled combustion mode with stoichiometric air/fuel mixture (SI-Throttled/Stoich) until reaching full load. Split injection may be utilized in either of the latter two modes in order to limit the maximum rate of cylinder pressure rise.

It should be pointed out that the calibration values in FIG. 4 are essentially the values for 1000 rpm in the look-up table of FIG. 6, to be subsequently discussed. For different engine speeds, similar operating strategies in fuel injection, valve timing, and combustion to those shown in FIG. 4 are observed experimentally with differences only in the exact NMEP values where various transitions should take place. In general, the NMEP values reported in FIG. 4 for the various transitions decrease with increasing engine speed. In particular, the high load operating limit decreases with increasing engine speed due to reduced heat losses to the coolant that results in increased cycle temperatures. Thus, the range of controlled auto-ignition combustion also decreases with increasing engine speed.

In a controlled auto-ignition engine, combustion phasing is strongly affected by charge temperature, e.g., higher charge temperatures advance combustion phasing and may result in knocking, while lower charge temperatures retard combustion phasing and may result in partial-burn or misfire. The present invention relates to a method for robust auto-ignition combustion control from low to high part load (and vice versa) during rapid speed transients. Using various combinations of injection and valve strategies, stable controlled auto-ignition combustion is maintained during speed transients with the present invention.

Figure 5:
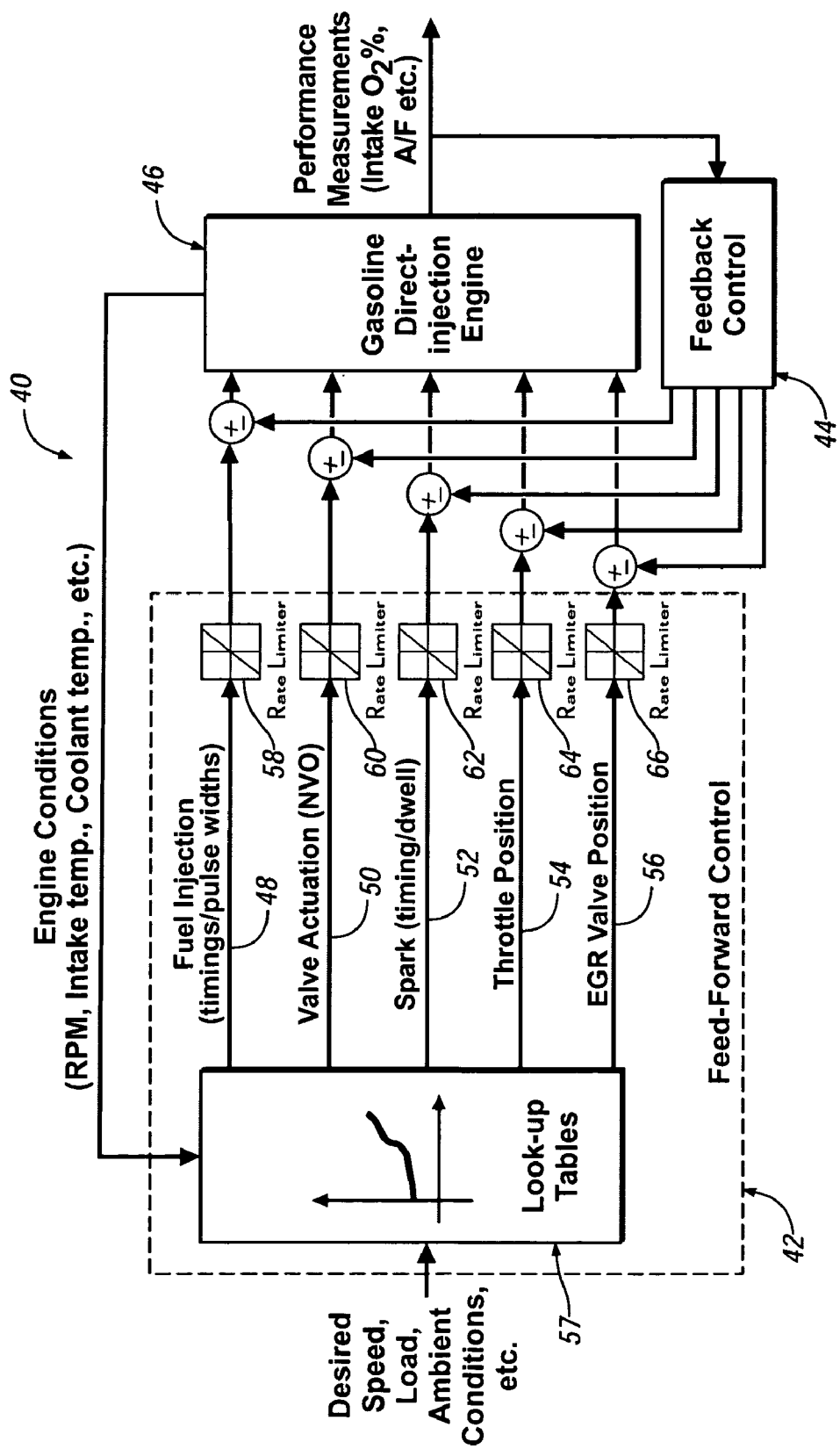
FIG. 5 is a diagrammatic view of an exemplary controller with which robust controlled auto-ignition combustion is maintained during various load transients in accordance with the present invention.

FIG. 5 shows a schematic diagram of an engine controller 40, according to the present invention, with which robust controlled auto-ignition combustion is achieved during speed transients with either a constant or variable fueling rate. The controller 40 includes a feed forward control 42 and a feedback control 44, connected with associated components of a representative gasoline direct-injection engine 46, although the present invention focuses on the feed forward control.

The feed forward control 42 is crucial to achieve a fast system response and it includes two major elements, look-up tables and rate limiters. Based on the desired load and engine operating conditions, required fuel injection timings (FI) and pulse widths (fueling rate) 48, valve actuation (NVO) 50 spark timing (SI) 52, throttle position 54, and EGR valve position 56 are calculated from the look-up tables 57 to control the combustion phasing. Also, depending on the current engine operating conditions and driver's load demand, variable rate limiters 58, 60, 62, 64, 66 are used to compensate different dynamics in the system, e.g., air and fuel dynamics, as will be discussed later in detail.

Figure 6:
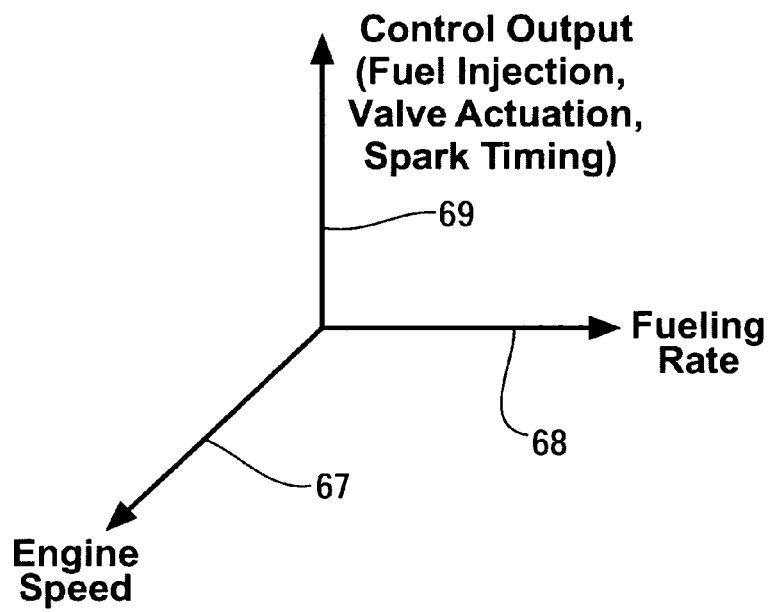
FIG. 6 is a graph showing the detailed structure of the look-up table used in the feed forward control.

FIG. 6 is an operational diagram of a look-up table in which two input variables are engine speed 67 and fueling rate 68 and control output variables 69 include fuel injection, valve actuation and spark timing. It should be noted that, unlike the more conventional SI engines, the fueling rate is not necessarily proportional to the driver-requested torque (or load, which is based on the pedal input) for the proposed application. Due to the more complex nature of many possible combustion modes, it is not uncommon that an SIDI/HCCI engine actually produces more torque for slightly less fueling rate when the engine speed increases, and vice versa. It is crucial to determine the proper injection strategy and the fueling rate for each combustion mode depending on the requested torque and engine operating condition as will be discussed later. Therefore, it should be understood that the different fueling rates used in the tests reported hereafter are intended only to demonstrate the proposed speed transient control methodology under engine loads. The exact mapping from the driver-requested engine torque to the required fueling rate must be developed for the operational conditions of each engine model.

As will be shown later, robust controlled auto-ignition combustion has been maintained during rapid speed transients in the test cell using only the feed forward control 42 with calibrated look-up tables 57. However, to operate in a more uncertain environment, the feedback part will be used to further enhance the overall system robustness. Physical variables, such as the exhaust gas temperature and the recompression pressure, etc., can be used for feedback control. It should also be pointed out that, while the examples presented here are from the engine operating in the CAI/Lean region (or mode) the same methodology is expected to be applicable to the other regions as well. In the latter case, the look-up tables will include fuel injection, variable valve actuation, spark timing, throttle position and EGR valve position. It is anticipated that the use of feedback control will be more important in these broader operating regions.

In general operation of the feed forward control 42 during rapid speed transients with HCCI (homogenous charge compression ignition) engine operation, inputs to the engine, including at least spark timing (SI), fuel injection timing (FI) and valve timing (and, where used, throttle position and EGR valve position) are set equal to (synchronized with) steady state inputs corresponding to the current fueling mass flow rate (fueling rate). Pre-calibrated steady state inputs are stored in the look-up tables 57, and the engine inputs are determined by interpolating values of steady state inputs in the look-up tables.

Figure 7:
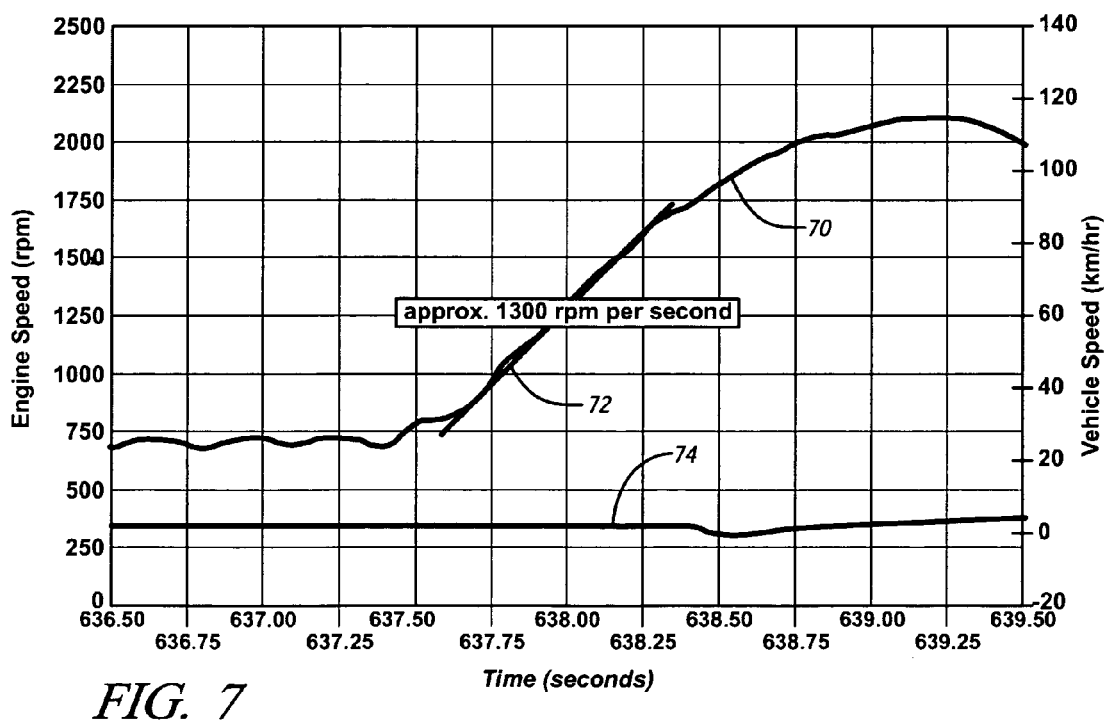
FIGS. 7 and 8 are graphs of engine test results with speed changes varying between two of the most extreme speed transients (accelerating and decelerating) required during the New European Driving Cycle (NEDC) test for a typical passenger car.
Figure 8:
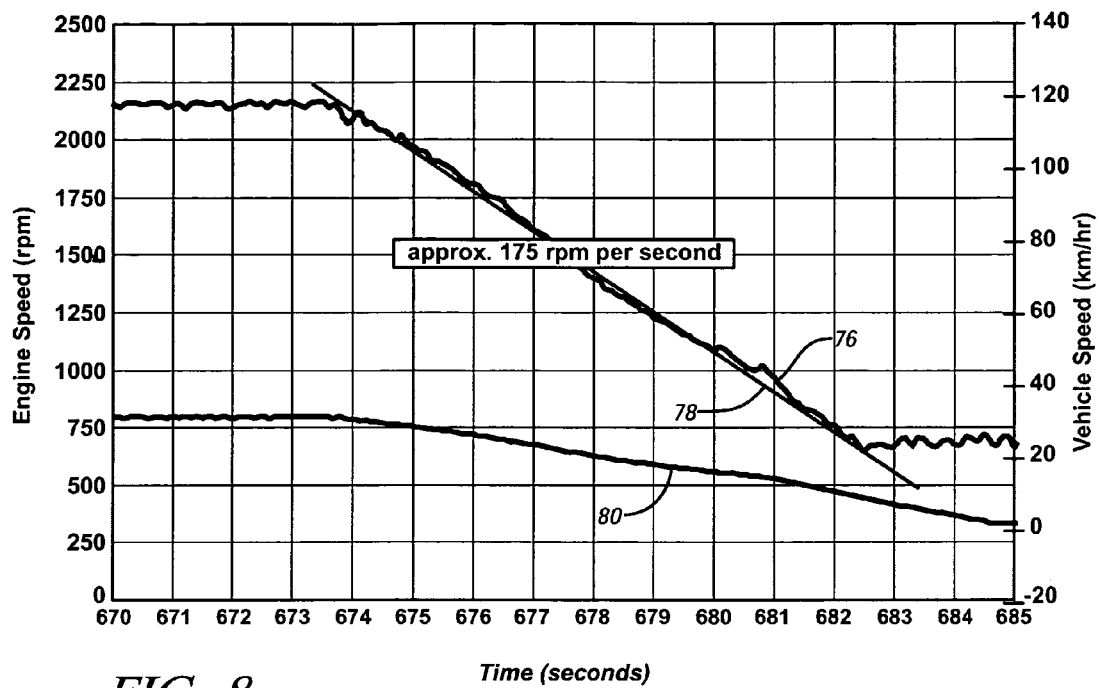

The effectiveness of the present invention is demonstrated using test results with speed change rates that vary between the two most extreme speed change rates occurring during the New European Driving Cycle (NEDC) shown in FIGS. 7 (acceleration transient) and 8 (deceleration transient). In FIG. 7, line 70 shows engine speed in rpm vs. time in seconds for a fast acceleration. Straight line 72 indicates the peak acceleration rate of about 1300 rpm/sec. Line 74 shows vehicle speed in km/hr. In FIG. 8, line 76 shows engine speed in rpm vs. time in seconds for a fast deceleration. Straight line 78 indicates the peak deceleration rate of about 175 rpm/sec. Line 80 again shows vehicle speed in km/hr.

FIGS. 9-21 graphically present the results of speed transient tests each run at 6 different speed change rates of 1100 (A), 900 (B), 700 (C), 500 (D), 300 (E), and 100 (F) rpm/sec, wherein characters A-F identify the lines indicating the associated speeds of the tests.

Figure 9:
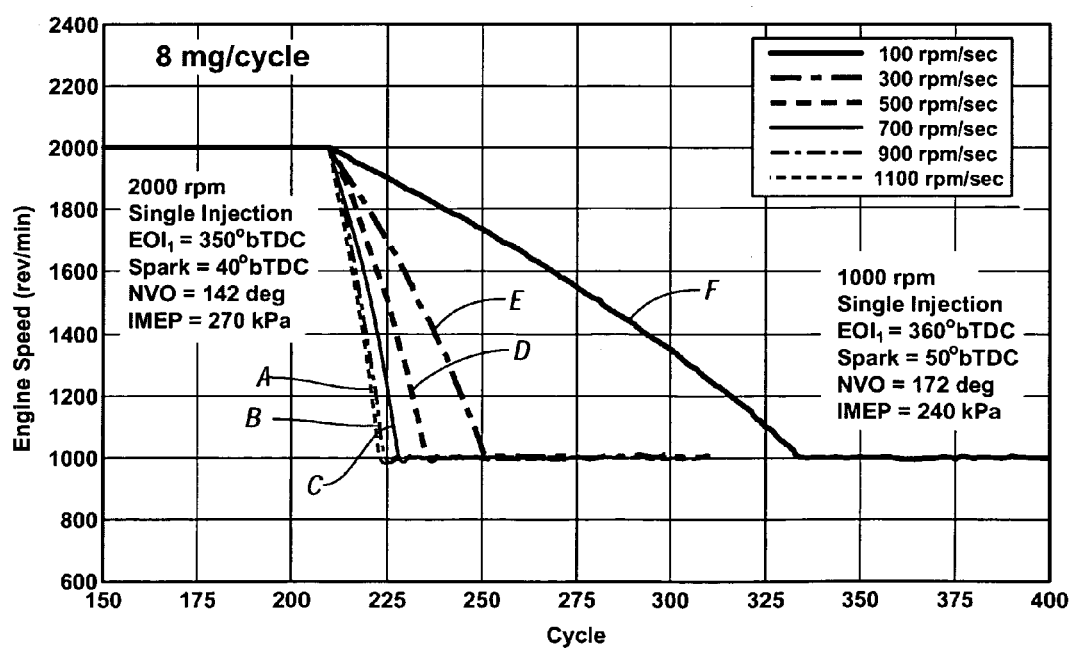
FIG. 9 is a graph of speed transient tests from high to low speed with constant fueling rates of 8 mg/cycle, with various tested speed change rates.
Figure 10:
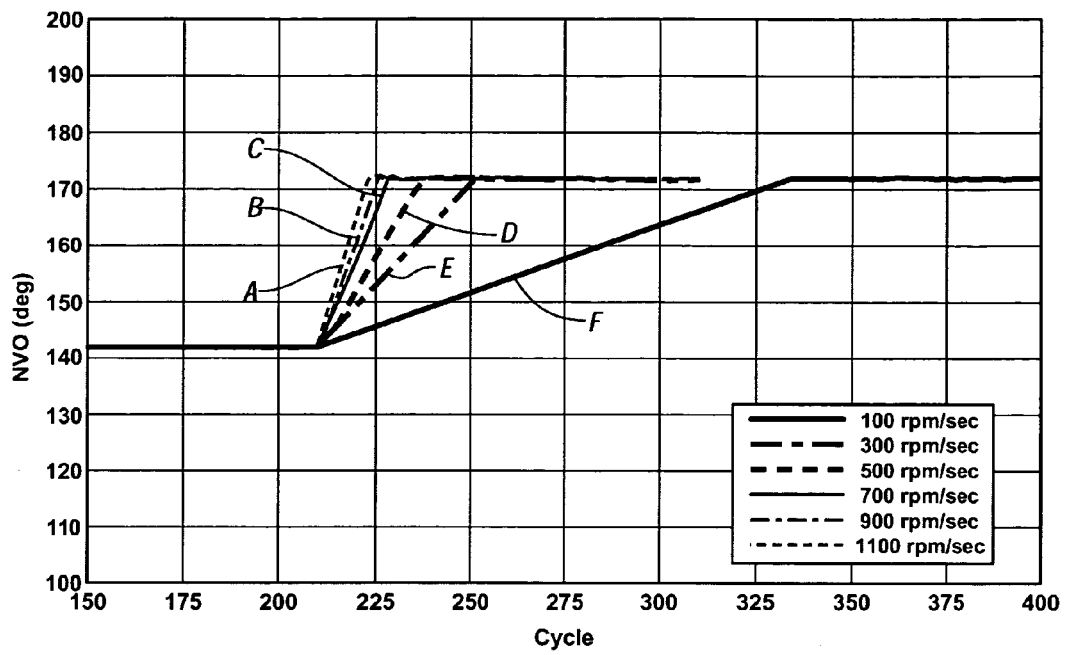
FIG. 10 is a graph of the commanded NVO during the speed transient tests of FIG. 9.

FIG. 9 shows engine speed vs. cycles for speed transient tests of deceleration from 2000 rpm high speed to 1000 rpm low speed with a constant fueling rate of 8 mg/cycle. Also shown in the figure are the fuel injection, spark timing, and NVO at the two end speed points during steady state operations. All these parameters follow the same change rate as that of the respective speed change rate. An example is shown in FIG. 10, where the commanded NVO during the speed transient tests of FIG. 9 is presented.

Figure 11:
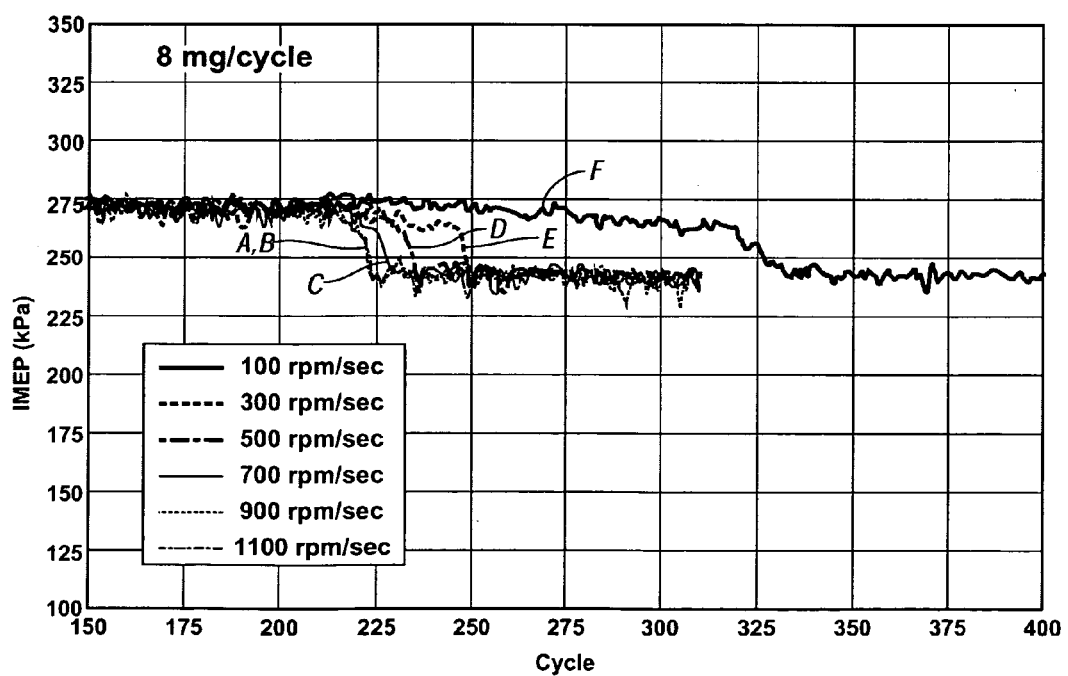
FIG. 11 is a graph of the measured Indicated Mean Effective Pressure (IMEP) during the speed transient tests of FIG. 9.

FIG. 11 shows the measured IMEP during the speed transient tests of FIG. 9. It is clear from the figure that the measured IMEP values change from 270 kPa to 240 kPa right after the speed transition for all speed change rates examined. Further, the controlled auto-ignition combustion is robust everywhere during all speed transient tests with no observed misfire or partial burns.

Figure 12:
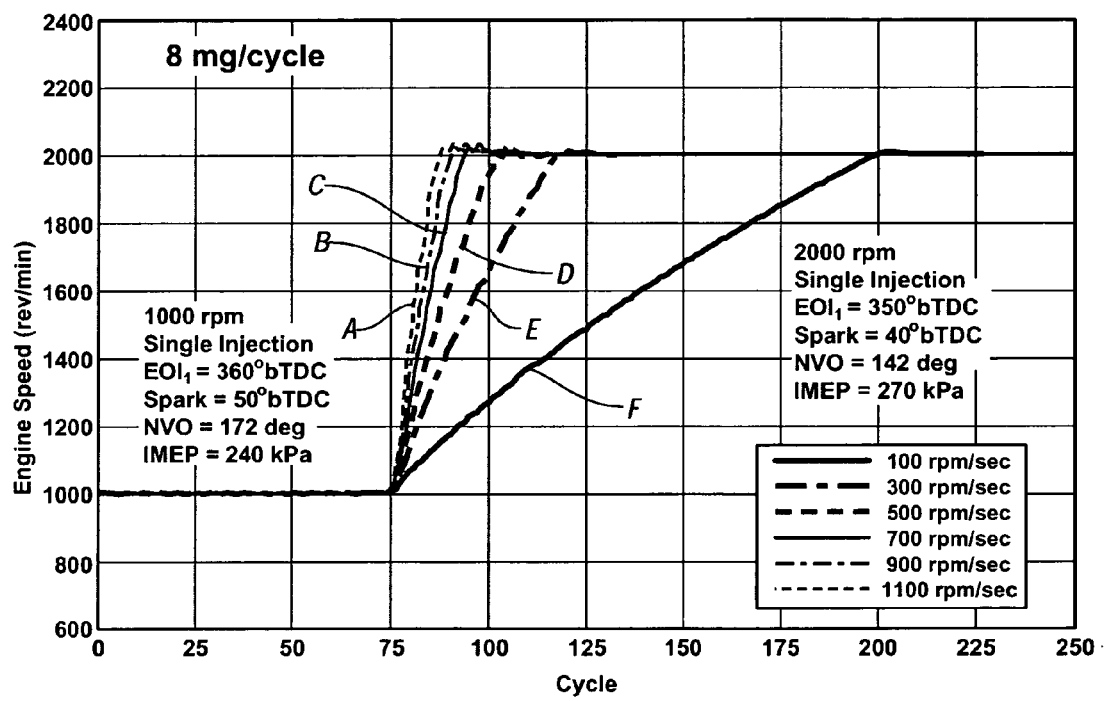
FIG. 12 is a graph of speed transient tests from low to high speed with constant fueling rates of 8 mg/cycle, with various tested speed change rates.

FIG. 12 shows engine speed vs. cycles for speed transient tests of acceleration from 1000 rpm low speed to 2000 rpm high speed with a constant fueling rate of 8 mg/cycle. Also shown in the figure are the fuel injection, spark timing, and NVO at the two end speed points during steady state operations.

Figure 13:
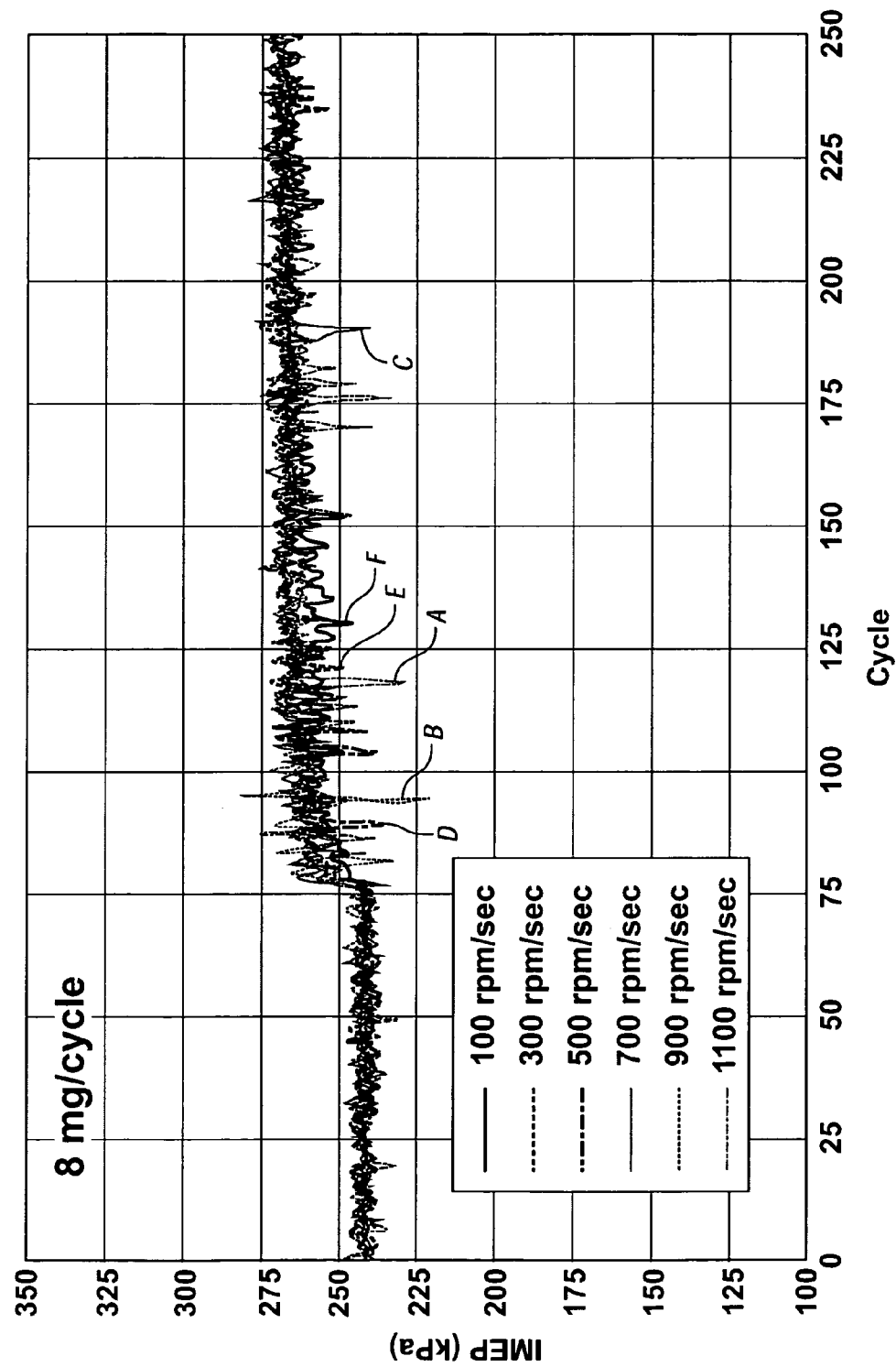
FIG. 13 is a graph of the measured IMEP during the speed transient tests of FIG. 12.

FIG. 13 shows the measured IMEP during the speed transient tests of FIG. 12. It can be seen that the measured IMEP values first change from 240 to 265 kPa right after the speed transition for all speed change rates examined. It then takes about another 50 cycles before the measured IMEP reaches the steady state value of 270 kPa. It can also be observed that the controlled auto-ignition combustion is less robust with occasional partial burns during and after the speed transition. By comparing FIGS. 11 and 13, the controlled auto-ignition is seen to be more robust in transitions from high to low speed than from low to high speed at a constant fueling rate.

Figure 14:
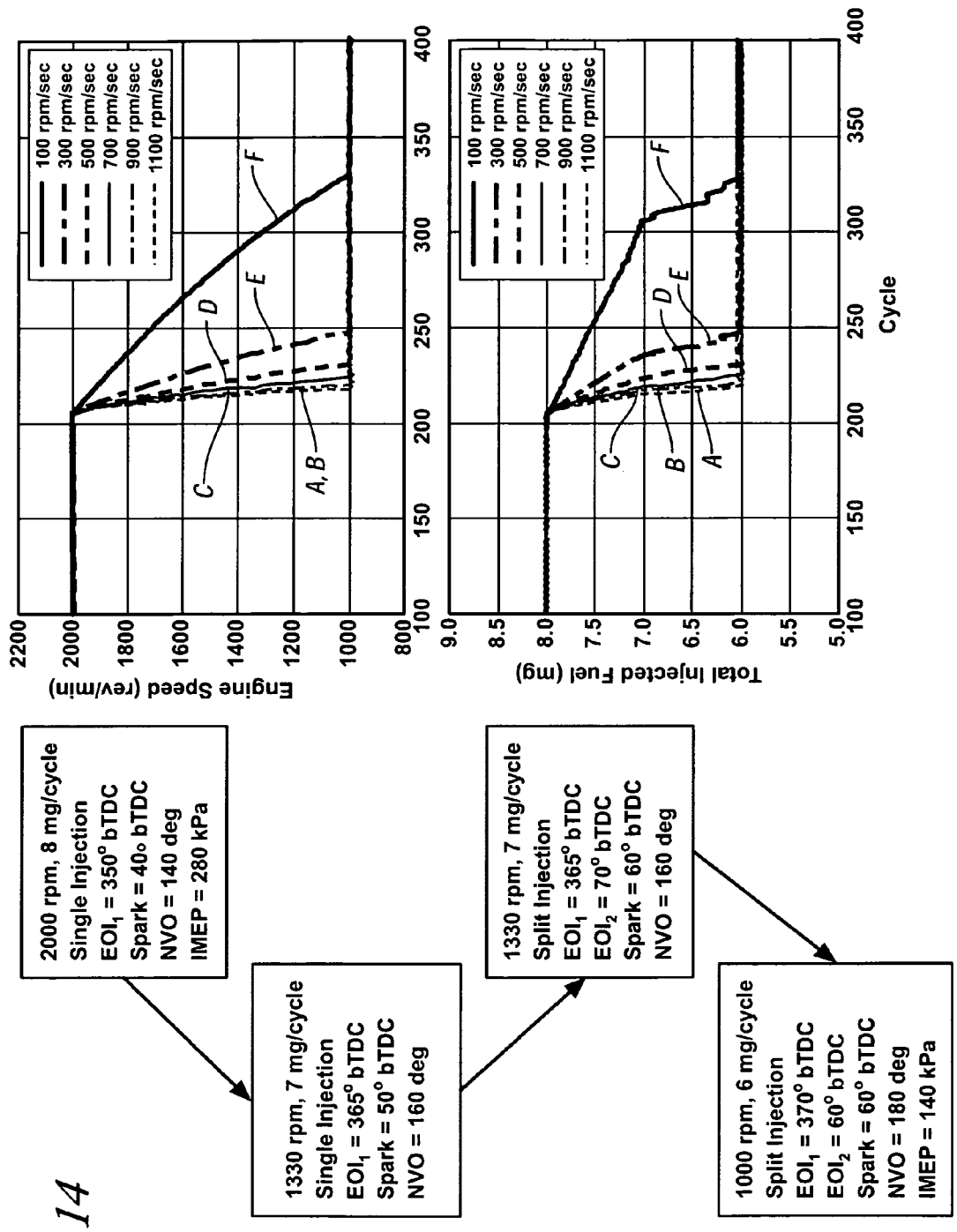
FIG. 14 is a graph of speed transient tests from high fueling rate (8 mg/cycle) high speed (2000 rpm) to low fueling rate (6 mg/cycle) low speed (1000 rpm), with various tested speed change rates.

FIG. 14 shows engine speed transient tests from a high fueling rate (8 mg/cycle) high speed (2000 rpm) to a low fueling rate (6 mg/cycle) low speed (1000 rpm) low speed. Also shown in the FIG. 14 are the speed, fuel injection, spark, timing, and NVO at the two end speed points during steady state operations. During the speed transient tests, all these parameters followed the same change rate as that of the respective speed change rate.

Figure 15:
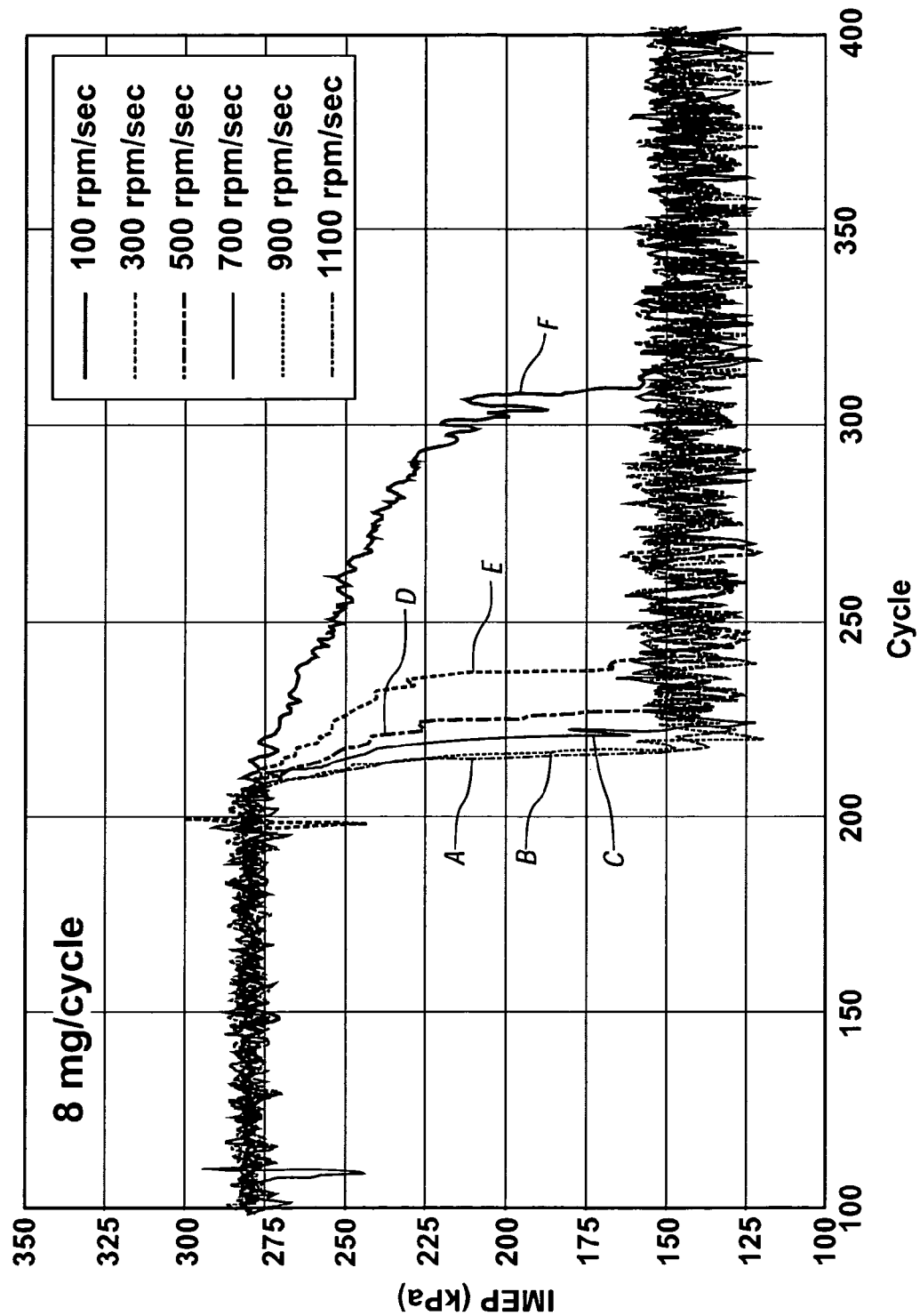
FIG. 15 is a graph of the measured IMEP during the speed transient tests of FIG. 14.

FIG. 15 shows the measured IMEP during the speed transient tests of FIG. 14. It is clear from the figure that the measured IMEP values change from 280 kPa to 140 kPa right after the speed transition for all speed change rates examined. Further, the controlled auto-ignition combustion is robust everywhere during all speed transient tests with no observed misfire or partial burns. The apparent higher standard deviation of IMEP for engine operation with 1000 rpm and 6 mg/cycle is typical for the low load controlled auto-ignition combustion.

Figure 16:
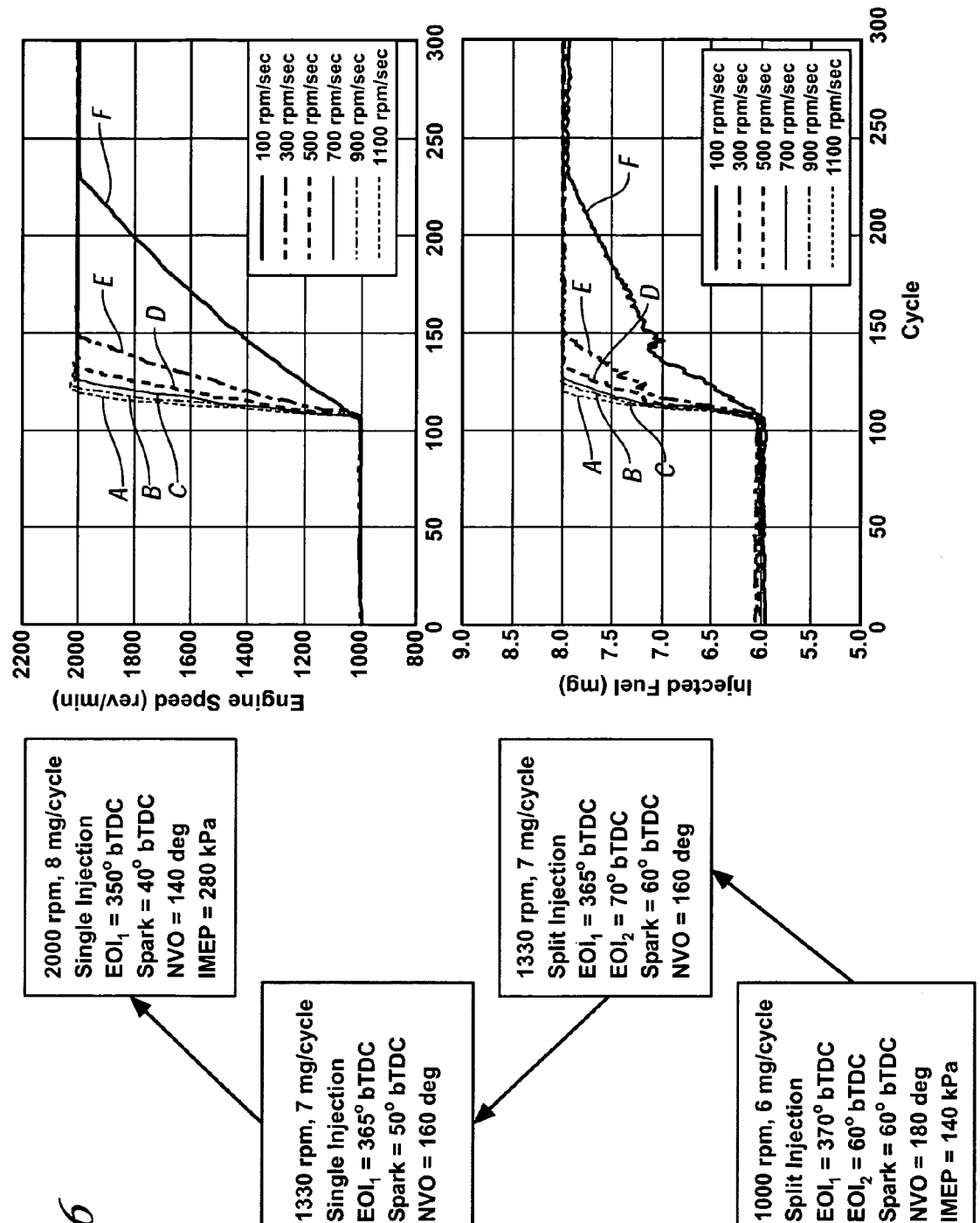
FIG. 16 is a graph of speed transient tests from low fueling rate (6 mg/cycle) low speed (1000 rpm) to high fueling rate (8 mg/cycle) high speed (2000 rpm), with various tested speed change rates.

FIG. 16 shows engine speed transient tests from a low fueling rate (6 mg/cycle) low speed (1000 rpm) to a high fueling rate (8 mg/cycle) high speed (2000 rpm). Also shown in FIG. 16 are the speed, fuel injection, spark timing, and NVO for four test points during steady state operations. During the speed transient tests, all these parameters followed the same change rate as that of the respective speed change rate.

Figure 17:
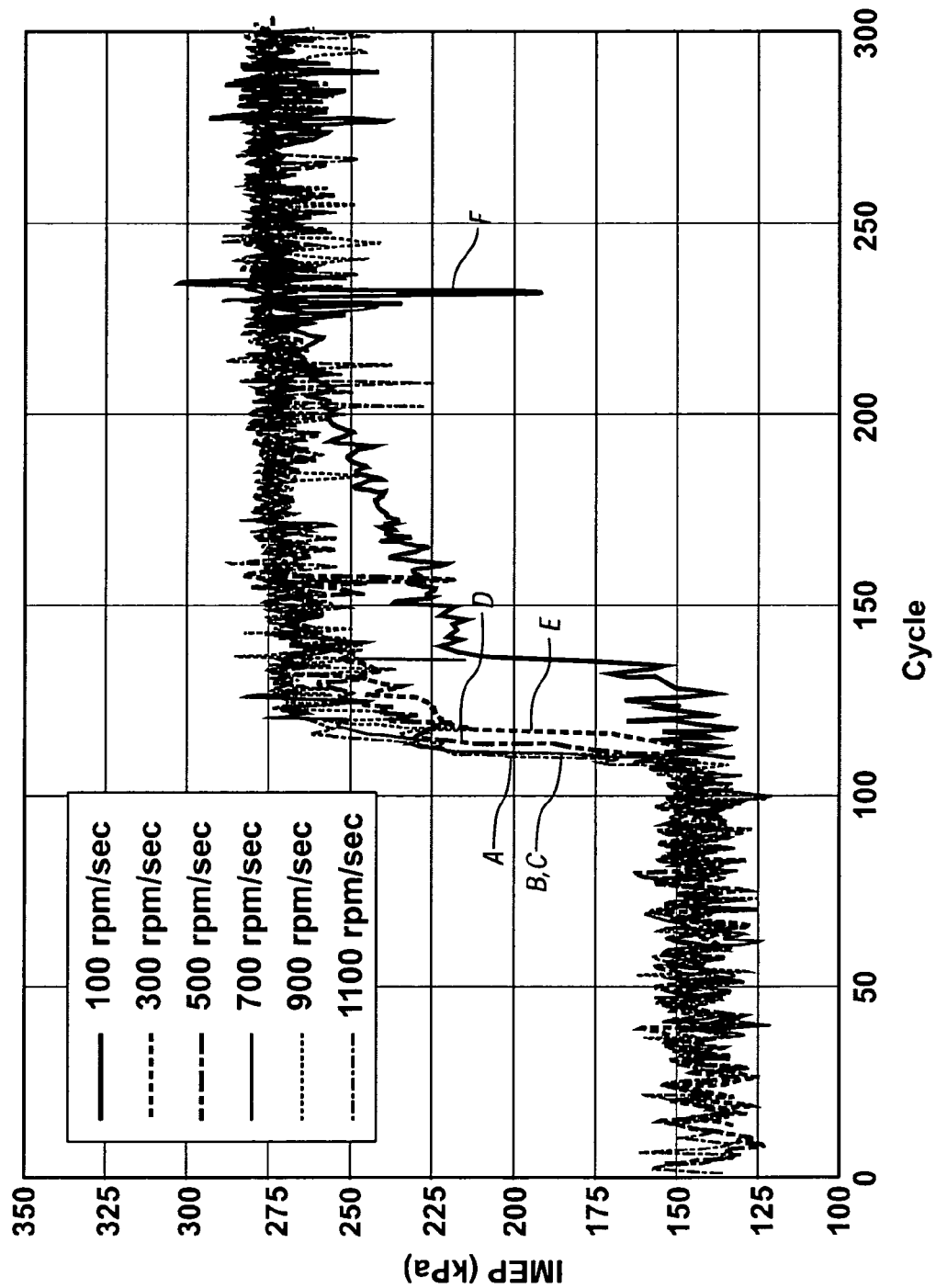
FIG. 17 is a graph of the measured IMEP during the speed transient tests of FIG. 16.

FIG. 17 shows the measured IMEP during the speed transient tests of FIG. 16. It can be seen from the figure that the measured IMEP values change from 140 kPa to 270 kPa right after the speed transition for all speed change rates examined. It then takes about another 100 cycles before the measured IMEP reaches the steady state value of 280 kPa. It can also be observed that the controlled auto-ignition combustion is less robust with occasional partial burns during and after the speed transition. By comparing FIGS. 15 and 17, the controlled auto-ignition combustion is seen to be more robust in transitions from a high speed high load operating point to a low speed low load operating point.

Figure 18:
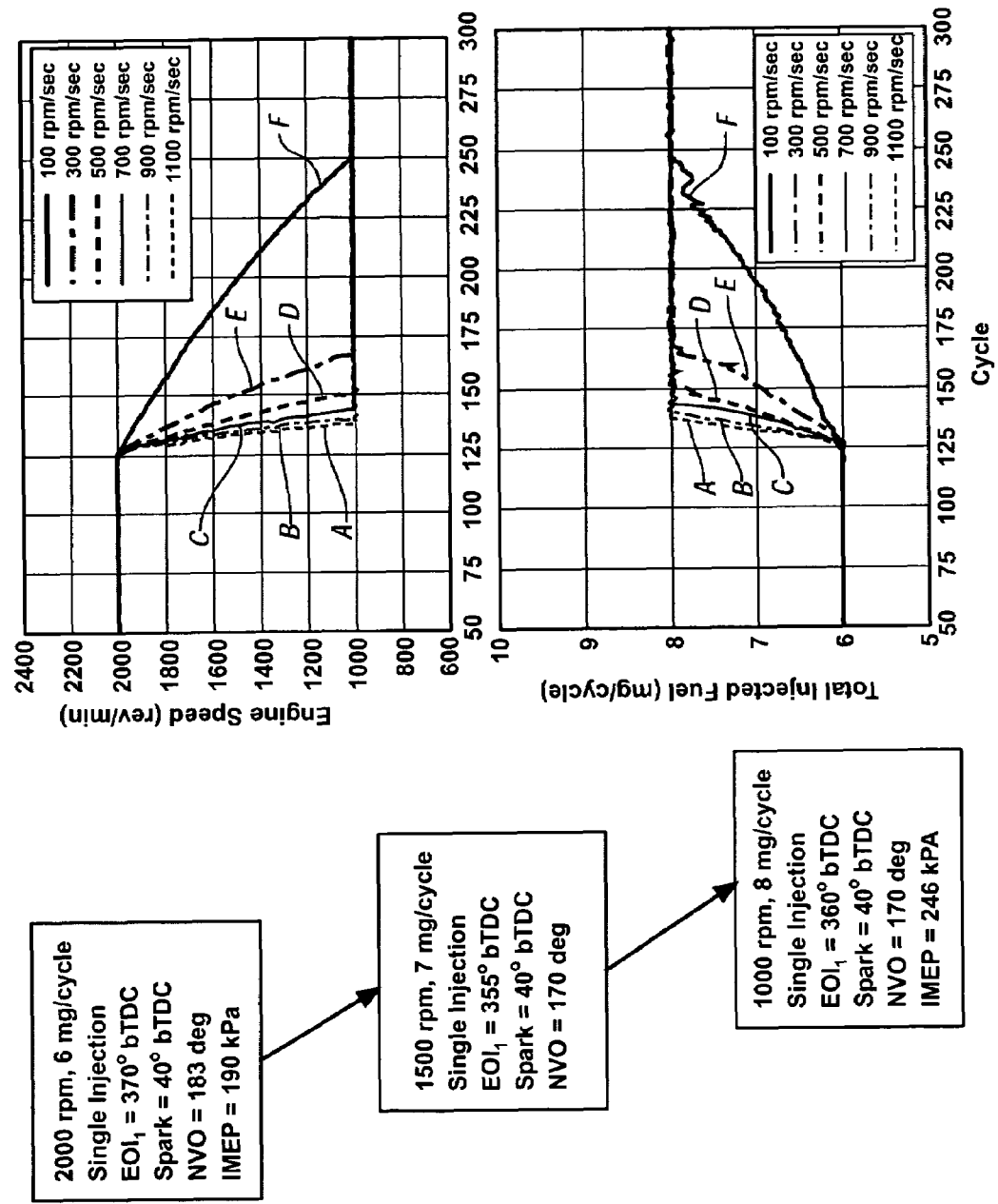
FIG. 18 is a graph of speed transient tests from low fueling rate (6 mg/cycle) high speed (2000 rpm) to high fueling rate (8 mg/cycle) low speed (1000 rpm), with various tested speed change rates.

FIG. 18 shows engine speed transient tests from a low fueling rate (6 mg/cycle) high speed (2000 rpm) to a high fueling rate (8 mg/cycle) low speed (1000 rpm). Also shown in FIG. 18 are the speed, fuel injection, spark timing, and NVO for three test points during steady state operations. During the speed transient tests, all these parameters followed the same change rate as that of the respective speed change rate.

Figure 19:
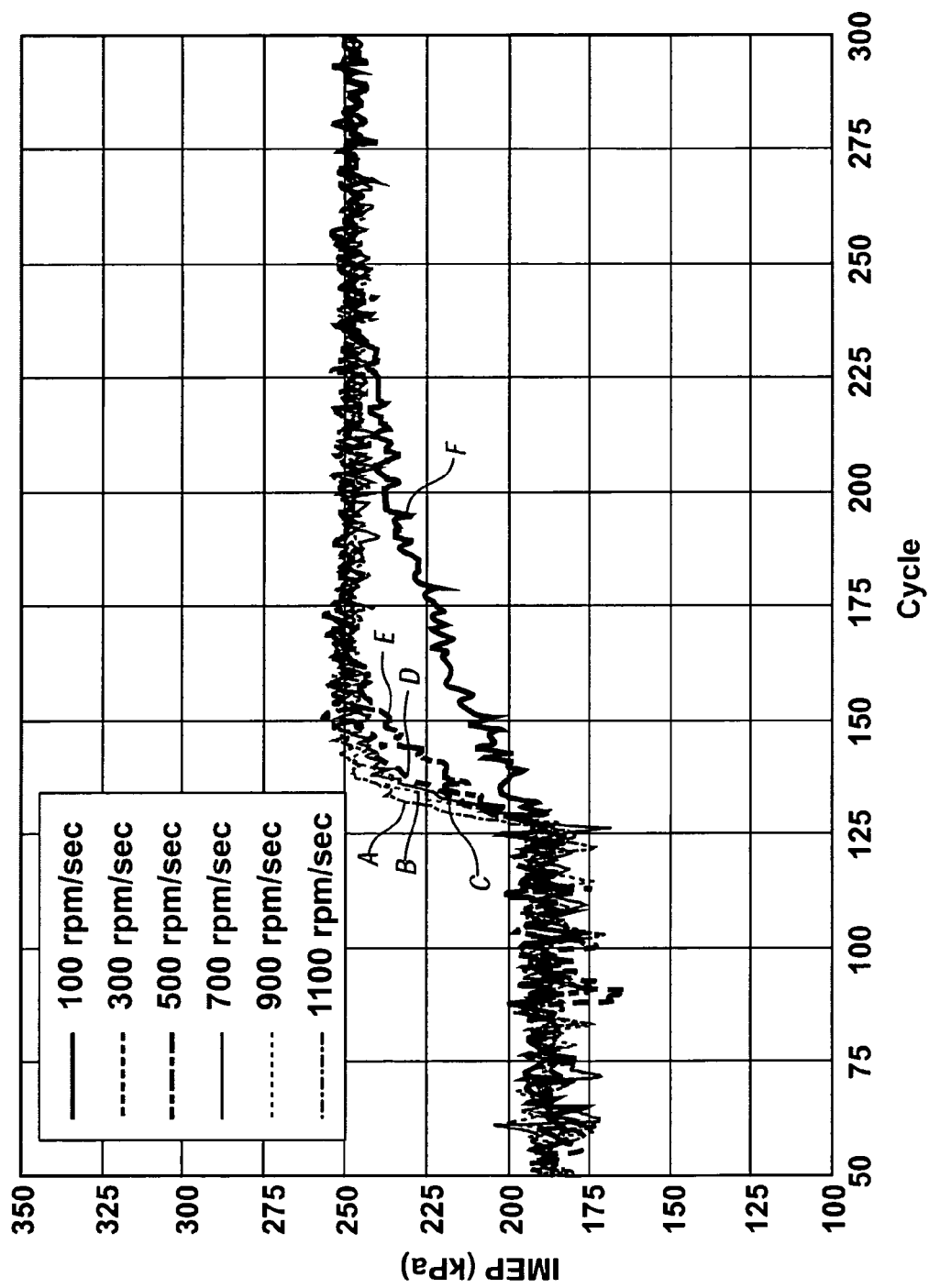
FIG. 19 is a graph of the measured IMEP during the speed transient tests of FIG. 18.

FIG. 19 shows the measured IMEP during the speed transient tests of FIG. 18. It is clear from the figure that the measured IMEP values change from 190 kPa to 246 kPa right after the speed transition for all speed change rates examined. Further, the controlled auto-ignition combustion is robust everywhere during all speed transient tests with no observed misfire or partial burns.

Figure 20:
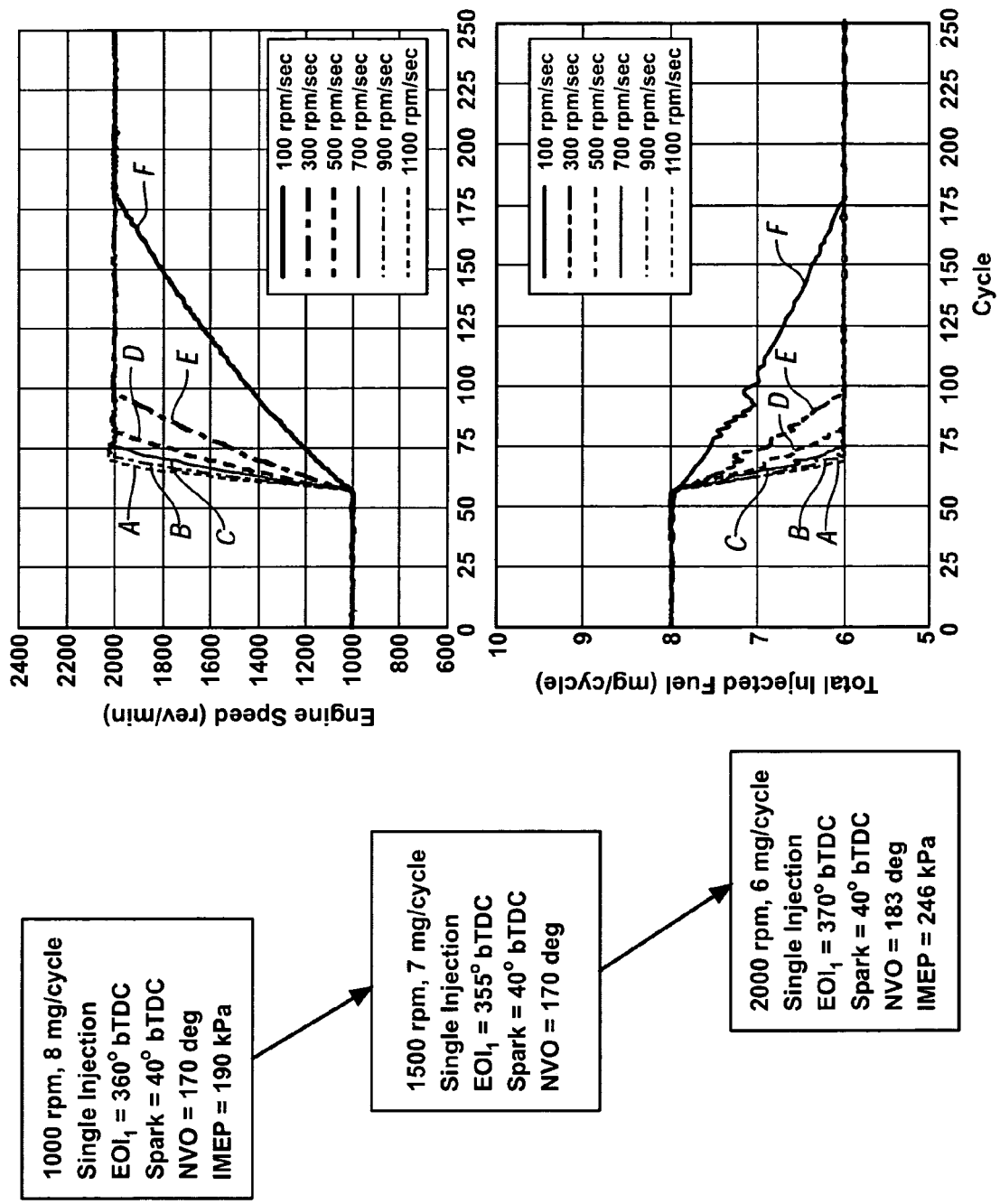
FIG. 20 is a graph of speed transient tests from high fueling rate (8 mg/cycle) low speed (1000 rpm) to low fueling rate (6 mg/cycle) high speed (2000 rpm), with various tested speed change rates.

FIG. 20 shows engine speed transient tests from a high fueling rate (8 mg/cycle) low speed (1000 rpm) to a low fueling rate (6 mg/cycle) high speed (2000 rpm). Also shown in FIG. 20 are the speed, fuel injection, spark timing, and NVO for three test points during steady state operations. During the speed transient tests, all these parameters followed the same change rate as that of the respective speed change rate.

Figure 21:
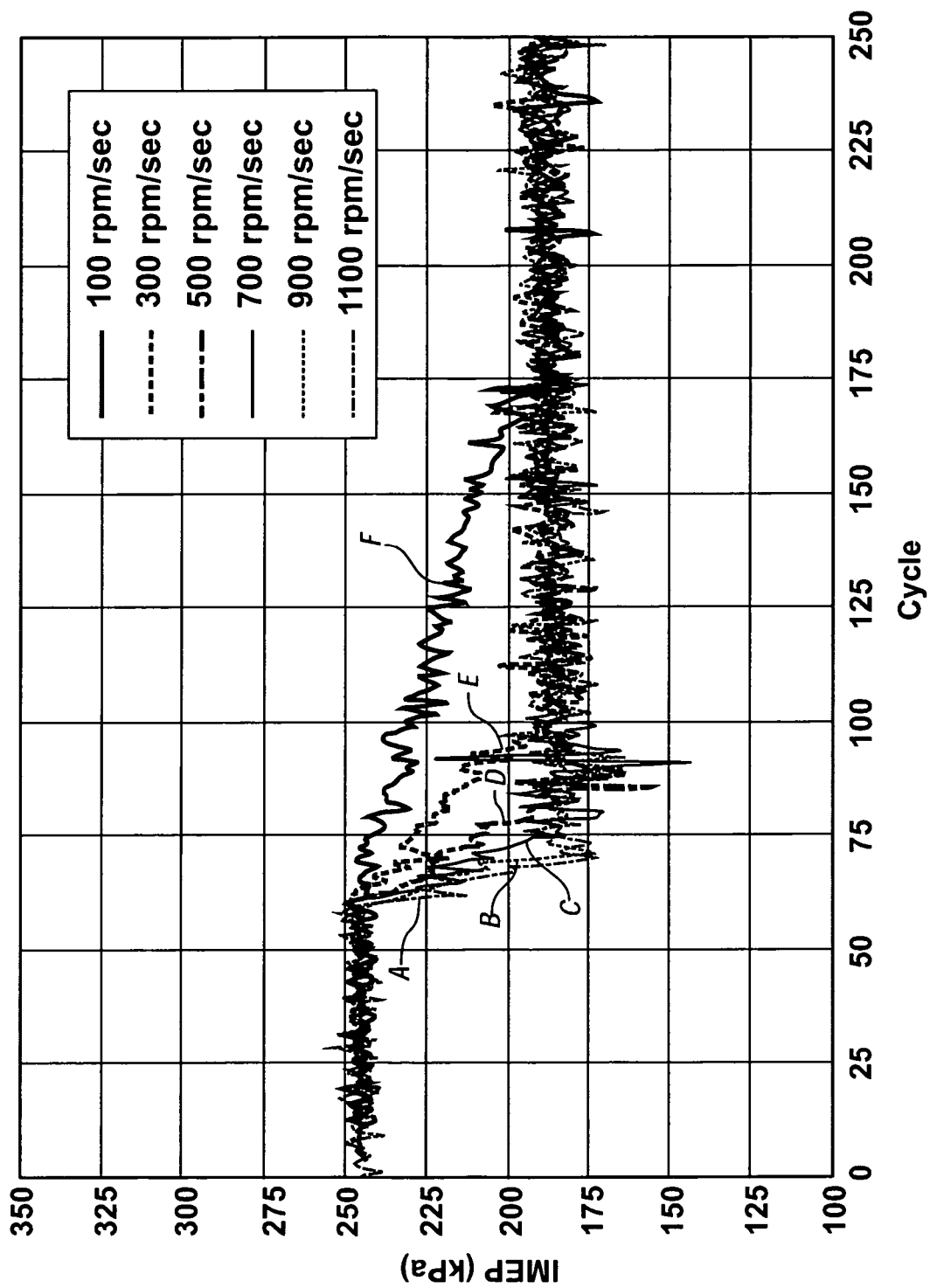
FIG. 21 is a graph of the measured IMEP during the speed transient tests of FIG. 20.

FIG. 21 shows the measured IMEP during the speed transient tests of FIG. 20. It can be seen from the figure that the measured IMEP values change from 246 kPa to 185 kPa right after the speed transition for all speed change rates examined. It then takes about another 100 cycles before the measured IMEP reaches the steady state value of 190 kPa. In this case, however, the controlled auto-ignition combustion is only slightly less robust than that shown in FIG. 19 for the range of speed and fueling rate examined.

In summary, the present invention is effective in maintaining robust auto-ignition combustion during speed transients with constant or variable fueling rates. No misfire or significant partial burns occurred during all the speed transient tests.

It should be understood that the broad concepts of the present invention are not limited to use with the exemplary feed forward/feedback control system referred to in the application. Nor is the invention limited to the use of controls based upon lookup tables as discussed herein. Further, for an engine operable in multiple modes of operation over its full operating range, some engine control inputs used in one mode of operation may be inactive in another mode.

As used herein, the term "synchronizing change rates" implies that the change rates of related control inputs are changed proportionally to the change in speed or load to which they are related. Thus, change rates of control inputs could be constant or varying relative to their related speed or load change. They could also be varying during one portion of a speed change, for example, and inactive, or fixed, in another portion where function of the input may be unneeded or performed by another input device. In such a case, the control input would have a fixed or variable change rate relationship with the speed change rate when the input is active but would have a zero rate relationship when the input is inactive.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. Method for control of a direct-injection engine operated with controlled auto-ignition during speed transient operations, the method comprising:

operating the engine at steady state, within a homogeneous charge compression-ignition (HCCI) load range, with fuel-air-diluent mixtures at predetermined conditions, for each speed and load, of fueling mass flow rate (fueling rate), injection timing (FI), spark timing (SI), throttle position, exhaust gas recirculation (EGR) valve setting, and exhaust recompression obtained by negative valve overlap (NVO) between closing of the exhaust valves and opening of the intake valves in each cylinder; and controlling the engine during speed transients from a first steady state speed condition to a second steady state speed condition by synchronizing change rates of predetermined control inputs to the engine with the current engine speed change rate, the predetermined control inputs including at least three of FI, SI, throttle position, EGR valve setting and NVO.

2. Method as in claim 1 wherein the engine is operated with lean fuel-air-diluent mixtures and the control inputs include FI, SI and NVO.

3. Method as in claim 1 wherein the engine is operated with stoichiometric fuel-air-diluent mixtures and the control inputs include FI, SI, NVO, throttle and EGR valve setting.

4. Method as in claim 1, wherein the speed transients are accompanied by load transients involving concurrent fueling rate changes and the method includes synchronizing change rates of the control inputs with the current engine speed change rate and the current fueling rate.

5. Method as in claim 1, wherein the engine inputs are synchronized by a feed forward control that maintains predetermined relationships between instantaneous speed values and corresponding values of related engine inputs during speed transient operations.

6. Method as in claim 5 wherein said predetermined relationships are provided by lookup tables accessible by a computer control system.

7. Method as in claim 5 including a feedback control that adjusts the feed forward control based on measured values of engine performance to minimize errors in the controlled output values and more closely conform the output values with the predetermined relationships.

* * * * *